Patented May 31, 1938

2,119,506

UNITED STATES PATENT OFFICE 2,119,506

ANTIFREEZE COMPOSITIONS

Cecil E. Watts, Terre Haute, Ind., assignor to Commercial Solvents Corporation, Terre Haute, Ind., a corporation of Maryland No Drawing. Application November 23, 1936, Serial No. 112,296

5 Claims. (Cl. 252—5)

My invention relates to fluids used as antifreeze liquids in automobile radiators and the like.

Freezing point depressants of various types have been recommended and used with varying degrees of success in the past. The most satisfactory of these have been the water-soluble alcohols such as methyl, ethyl and isopropyl alcohols, and ethylene glycol and glycerine. None of these, however, has been entirely satisfactory.

The low-boiling monohydric alcohols, while in general quite satisfactory from the standpoint of giving compositions which freeze at low temperatures, are subject to the disadvantage of relatively high volatility and hence require rather frequent renewal. In addition, they are somewhat corrosive to the metals used in the construction of automobile radiators. The so-called permanent types of anti-freeze agents such as ethylene glycol and glycerine boil at considerably higher temperatures than either methyl or ethyl alcohols, the alcohols most commonly used in anti-freeze compositions, and hence possess the distinct advantage of not requiring renewal during the entire winter unless the liquid should be lost mechanically. Such materials, however, are also distinctly corrosive to the metals of the automobile cooling system and in addition are subject to foaming with consequent mechanical loss. A still further disadvantage in the use of such materials is the fact that they are in general quite viscous at subnormal temperatures, thus requiring their dilution with viscosity reducing substances.

The object of my invention is to provide an anti-freeze composition substantially free from the defects of the various types of such compositions previously available, which may at the same time be practically and economically manufactured. In addition, as will be evident from the description which follows, my new composition possesses still further advantages over previous materials.

In producing my improved anti-freeze composition, I add to the low boiling monohydric alcohols certain materials which I have found to be particularly suitable for reducing the corrosion and volatility of the alcohols. Certain of these materials may also be regarded as "slush-forming" substances, inasmuch as they prevent the anti-freeze composition from becoming a solid at the normal freezing temperature of the composition and instead render it mobile, thereby preventing the damage to radiators that normally results when a liquid freezes to a solid. It is evident, therefore, that even if through some accident the radiator contains too little anti-freeze composition for any given temperature the radiator will still be protected from the damage ordinarily resulting from the congealing of the cooling fluid contained therein.

The following example will illustrate my new anti-freeze composition:

Example

| | | |
|---|---|---|
| Ethyl alcohol | gals | 100 |
| Para-cymene | do | 1 |
| Alpha ethyl beta propyl acrolein | do | ½ |
| Sodium nitrite | lbs | 2.5 |

The ethyl alcohol may be any grade approved for use as a radiator anti-freeze, such as the various grades of completely denatured alcohol, and hence generally contains certain other materials as denaturants. The presence of such materials, however, does not affect deleteriously my new composition.

The proportions of the various constituents of my new anti-freeze composition may be varied somewhat and certain additions thereto may be made without departing from the scope of my invention. The amounts of the materials given are substantially the preferred proportions. Under certain circumstances, however, it may be found desirable to vary the amounts of one or more of the constituents somewhat. For example, the wide variation in the character of the waters used with anti-freeze compositions in different sections of the country change to some extent the properties of the resulting radiator solution and thus make certain changes in the formulation of the freezing point depressant advisable. For example, certain types of water are much more alkaline than others and it is generally considered that such solutions are conducive to increased corrosion of certain of the metals used in radiator construction. Radiator solutions also tend to become more corrosive at elevated temperatures and with increased aeration. Under such circumstances, therefore, it is often found desirable to vary the proportions of the corrosion inhibitors used. Other types of inhibitors may likewise be satisfactorily used in place of the sodium nitrite. In some cases even it is desirable to use a different type of inhibitor, as for example, when the sodium nitrite has an undesirable effect upon some additional material like a dye which it is desired to include in the composition. In some cases also it is desirable to supplement the effect of the sodium nitrite with some other inhibitor. Examples of other corrosion inhibitors which may be satisfactorily used in place of or in addition to sodium nitrite in my anti-freeze composition are: chromates, sodium benzoate, borax, alkali tartrates, alkyl and aryl antimonyl tartrates, petroleum compositions, etc.

The proportions of the para-cymene and alpha ethyl beta propyl acrolein may also be varied somewhat although it is preferred not to use substantially less than the amounts specified in the example cited above. The upper limits of the amounts of these constituents which may be employed are in general governed primarily by their cost. The preferred range is: Para-cymene 1% to 10%; alpha ethyl beta propyl acrolein 0.5% to 10%.

My new anti-freeze composition, in addition to being relatively non-corrosive, remains mobile at a much lower temperature than other commonly used compositions of this type, thus giving added protection against radiator damage by freezing. It is also relatively non-volatile and hence need be renewed at much less frequent intervals than has been the case with the monohydric alcohol-containing anti-freeze compositions previously available. In general, therefore, it may be said to give better and more reliable protection while possessing fewer undesirable properties than the anti-freeze compositions previously available.

Now having described my invention, what I claim as new and novel is:

1. An anti-freeze fluid comprising a monohydric water-soluble alcohol, para-cymene, and alpha ethyl beta propyl acrolein.

2. An anti-freeze fluid comprising a mono-hydric water-soluble alcohol, para-cymene, alpha ethyl beta propyl acrolein, and a corrosion inhibitor.

3. An anti-freeze fluid comprising ethyl alcohol, para-cymene, alpha ethyl beta propyl acrolein, and a corrosion inhibitor.

4. An anti-freeze fluid comprising ethyl alcohol, para-cymene, alpha ethyl beta propyl acrolein, and sodium nitrite.

5. An anti-freeze fluid comprising ethyl alcohol, para-cymene, alpha ethyl beta propyl acrolein, and sodium nitrite, said fluid being relatively non-volatile, non-corrosive, and retaining its mobility at temperatures below normal freezing point of the composition.

CECIL E. WATTS.